(12) United States Patent
Ohashi et al.

(10) Patent No.: US 8,460,601 B2
(45) Date of Patent: Jun. 11, 2013

(54) VESSEL FOR MOLTEN METAL

(75) Inventors: Hideaki Ohashi, Higashiosaka (JP);
Nobuyuki Oka, Higashiosaka (JP);
Hirokazu Asada, Higashiosaka (JP)

(73) Assignee: Nippon Crucible Co., Ltd., Tokyo (JP)

( * ) Notice: Subject to any disclaimer, the term of this patent is extended or adjusted under 35 U.S.C. 154(b) by 287 days.

(21) Appl. No.: 12/863,825

(22) PCT Filed: Mar. 10, 2009

(86) PCT No.: PCT/JP2009/054507
§ 371 (c)(1),
(2), (4) Date: Jul. 21, 2010

(87) PCT Pub. No.: WO2009/116425
PCT Pub. Date: Sep. 24, 2009

(65) Prior Publication Data
US 2010/0289195 A1      Nov. 18, 2010

(30) Foreign Application Priority Data

Mar. 19, 2008   (JP) .................................. 2008-071683

(51) Int. Cl.
*B22D 41/02*      (2006.01)
(52) U.S. Cl.
USPC ............ 266/286; 501/94; 501/97.1; 501/98.1
(58) Field of Classification Search
USPC ................ 266/275, 280, 286; 501/96.3, 96.4, 501/98.1, 97.1, 94; 264/338
See application file for complete search history.

(56) References Cited

U.S. PATENT DOCUMENTS

| | | | | |
|---|---|---|---|---|
| 4,205,716 A | * | 6/1980 | Nakahira et al. | 164/465 |
| 5,135,893 A | * | 8/1992 | Dohi et al. | 501/91 |
| 5,185,300 A | * | 2/1993 | Hoggard et al. | 501/99 |
| 6,024,259 A | * | 2/2000 | Gardner et al. | 222/590 |

(Continued)

FOREIGN PATENT DOCUMENTS

| | | |
|---|---|---|
| CN | 1655894 A | 8/2005 |
| CN | 1774310 A | 5/2006 |

(Continued)

OTHER PUBLICATIONS

International Search Report mailed on May 19, 2009 for thecorresponding International patent application No. PCT/JP2009/054507.

(Continued)

*Primary Examiner* — Scott Kastler
*Assistant Examiner* — Michael Aboagye
(74) *Attorney, Agent, or Firm* — Posz Law Group, PLC

(57) ABSTRACT

The invention provides a vessel for molten metal comprising a vessel body formed of an alumina-silica-based material, and a protective layer formed of a silicon nitride- alumina-based material provided on the inner surface of the vessel body, wherein the material for the vessel body is adjusted to have an alumina content x of 72 to 95 parts by weight per 100 total parts by weight of alumina and silica, and the material for the protective layer is adjusted to have a silicon nitride content y per 100 total parts by weight of silicon nitride and alumina in such a manner that y applies to the following formulae: (1) $y<-1.1x+128$ and (2) $y>-0.5x+62.5$. The present invention provides a vessel for molten metal having excellent durability and corrosion resistance against hot molten metal.

2 Claims, 5 Drawing Sheets

U.S. PATENT DOCUMENTS

| | | | |
|---|---|---|---|
| 6,428,743 B1 * | 8/2002 | Stoupis et al. | 266/196 |
| 6,458,732 B1 * | 10/2002 | Doza et al. | 501/97.2 |
| 6,667,263 B1 * | 12/2003 | Guillo et al. | 501/96.4 |
| 7,354,547 B2 | 4/2008 | Ukaji et al. | |
| 7,507,366 B2 | 3/2009 | Mizuno et al. | |
| 7,514,034 B2 | 4/2009 | Abe et al. | |
| 2006/0119024 A1 | 6/2006 | Ukaji et al. | |
| 2007/0013114 A1 | 1/2007 | Abe et al. | |
| 2007/0108675 A1 | 5/2007 | Mizuno et al. | |

FOREIGN PATENT DOCUMENTS

| | | | |
|---|---|---|---|
| JP | H05-051278 A | | 3/1993 |
| JP | H09-182957 A | | 7/1997 |
| JP | H10-148475 | | 6/1998 |
| JP | 10-249513 | * | 9/1998 |
| JP | H10-249513 A | | 9/1998 |
| JP | 2002-029858 | * | 1/2002 |

OTHER PUBLICATIONS

Office Action dated Jul. 13, 2012 issued in corresponding Chinese Patent Application No. 200980109571.6 (and English translation).

* cited by examiner

VESSEL FOR MOLTEN METAL

TECHNICAL FIELD

The present invention relates to a vessel for storing various molten metals.

BACKGROUND ART

In vessels for molten metal for use in producing or storing molten metal, such as a melting furnace or a storage furnace, a lining has been conventionally provided on the inner surface of the vessel body to protect it from damage.

For example, Patent Document 1 discloses refractory materials, such as magnesia-based materials and alumina-based materials, which are used for lining the inner surface of an induction furnace. The aim of Patent Document 1 is to reduce the shrinkage of the volume and diminish the risk of permeation of foreign substances into the molten metal by forming spinel from the magnesia and alumina.

Patent Document 1: Japanese Unexamined Patent Publication No.1998-148475

DISCLOSURE OF THE INVENTION

Problem to be Solved by the Invention

In the aforementioned known vessel for molten metal, various experiments were conducted to improve the heat resistance, corrosion resistance, permeation resistance and the like of the lining material itself. However, conventionally known lining materials have yet to satisfactorily resolve the problem of the possible peeling of the lining from the vessel body. In recent years, because there has been an increased need to improve the quality of molten metal, the lining tends to be exposed to not only various additives added to the molten metal, but also to severe temperature conditions; therefore, peeling of the lining occurs more frequently, resulting in the deterioration of the durability.

An object of the present invention is to provide a vessel for molten metal having excellent durability and corrosion resistance to hot molten metal.

Means for Solving the Problem

The aforementioned object of the present invention can be achieved by a vessel for molten metal that comprises a vessel body formed of an alumina-silica-based material, and a protective layer formed of a silicon nitride-alumina-based material provided on the inner surface of the vessel body. The material for the vessel body is adjusted to have an alumina content x within the range of 72 to 95 parts by weight per 100 total parts by weight of alumina and silica, and the material for the protective layer is adjusted to have a silicon nitride content y per 100 total parts by weight of silicon nitride and alumina in such a manner that y applies to the following formulae (1) and (2).

$$y < -1.1x + 128 \quad (1)$$

$$y > -0.5x + 62.5 \quad (2)$$

Effect of the Invention

The present invention provides a vossel for molten metal having satisfactory high durability and corrosion resistance to a high-temperature molten metal.

BEST MODE FOR CARRYING OUT THE INVENTION

Embodiments of the present invention are explained in detail below with reference to the attached drawings. FIG. 1 is a longitudinal sectional view illustrating an induction furnace as an example of the vessel for molten metal according to one embodiment of the present invention. The induction furnace 1 shown in FIG. 1 can be used for melting various metals, such as iron, copper alloy, aluminum, special steel, and metal silicon for a wide variety of uses.

As shown in FIG. 1, the induction furnace 1 comprises a protective layer 3 formed on the inner surface of a crucible-like vessel body 2, and an induction coil 4 disposed on the outside of the vessel body 2. Silica sand or like aggregate (unshaped material) as a backsand 5 is disposed between the vessel body 2 and the induction coil 4, and a thermal insulating material 6 is provided on the inner surface of the induction coil 4. The form of the vessel body 2 is not limited, and may be a cylindrical shape, rectangular tube-like shape, etc.

The vessel body 2 is formed of an alumina ($Al_2O_3$)-silica ($SiO_2$)-based material, wherein the alumina content including mullite is set to 72 to 95 parts by weight per 100 total parts by weight of alumina and silica. If the alumina content is less than 72 parts by weight (i.e., silica is contained in a relatively large amount), it becomes difficult to obtain satisfactory heat. resistance. In contrast, if the alumina content exceeds 95 parts by weight (i.e., the silica content is unduly small), the deterioration of thermal shock resistance and permeation of molten metal may easily occur. The vessel body 2 can be produced by mixing an alumina powder with a silica powder at a predetermined ratio, adding a small amount of binder(s), subjecting the mixture to molding using a hydrostatic molding machine, and then sintering at about 1,500° C.

In order to obtain satisfactory strength and thermal stability for the vessel body 2, the total weight of alumina and silica is preferably at least 90% relative to the total weight of the vessel body 2 including the binders etc. As long as the total weight of alumina and silica falls within this range, some portion of alumina may be replaced with SiC, MgO, $ZrO_2$ or like other refractory component; and FeO, $Na_2O$ and like inevitable components may be further contained.

The protective layer 3 is formed of a silicon nitride-alumina-based material. In order to obtain satisfactory corrosion resistance and adhesion to the vessel body 2, it is preferable to set the total weight content of silicon nitride and alumina to at least 90% relative to the total weight of the protective layer 3 including the binders etc. If the silicon nitride content is unduly small (i.e., the alumina content is relatively large), it becomes difficult to obtain satisfactory corrosion resistance against the alkali components contained in the additives added to the molten metal. In contrast, if the silicon nitride content is unduly large (i.e., the alumina content is relatively small), it becomes difficult to obtain satisfactory strength, and the protective layer 3 is easily worn out by stirring the molten metal. The protective layer 3 can be formed in the following manner. A silicon nitride powder and an alumina powder are mixed at a predetermined ratio. A slurry is formed by adding water glass and like binders to the resulting mixture. The slurry is applied to the inner surface of the vessel body 2 by spraying, brushing, etc., and then subjected to a heat treatment at about 120° C. for at least 20 hours. If the thickness of the protective layer is unduly thin, satisfactory corrosion resistance cannot be obtained. However, if the protective layer is too thick, adhesion to the vessel body tends to decrease. Therefore, the thickness of the protective layer is preferably 0.2 to 1.0 cm, and more preferably 0.3 to 0.6 cm.

In the present invention, the most desirable materials for the vessel body 2 and the protective layer 3 are selected, and the components and their proportions contained in each of the materials for the vessel body 2 and the protective layer 3 are adjusted so that their thermal expansions will match each other. This prevents the protective layer 3 from being peeled off from the vessel body 2.

More specifically, it is assumed that the temperature of the molten metal is 1,600° C., which is the most severe temperature condition that would be actually observed in practical use, and that the thicknesses of the vessel body 2 and the protective layer 3 are respectively 45 mm and 6 mm, which are commonly employed thicknesses in this field. Based on these assumptions, the average temperatures of the vessel body 2 and the protective layer 3 are calculated using the thermal conductivity of each material. The results found that the average temperature of the vessel body 2 was about 1,391° C., and that of protective layer 3 was about 1,558° C. Accordingly, in order to make the thermal expansion amounts of the vessel body 2 and the protective layer 3 nearly equal, when the coefficient of thermal expansion of the vessel body 2 is expressed as $\alpha r$, and the coefficient of thermal expansion of the protective layer 3 is expressed as $\alpha c$, $1391 \times \alpha r = 1558 \times \alpha c$; therefore, the following formula applies:

$$\alpha c = 0.89 \times \alpha r \qquad (3).$$

The thermal expansion amount of the vessel body 2 varies depending on the weight ratio of alumina to silica, which are the main components. FIG. 2 shows the measurement results when the weight ratios of alumina to silica are plotted relative to the horizontal axis, and the coefficients of the thermal expansion are plotted relative to the vertical axis. The thermal expansion amount of the protective layer 3 also varies depending on the weight ratio of the silicon nitride to the alumina, which are main components. FIG. 3 shows the measurement results when the weight ratios of the silicon nitride to the alumina are plotted relative to the horizontal axis, and the coefficients of thermal expansion are plotted relative to the vertical axis. If the components and the proportions thereof of the material for either the vessel body 2 or the protective layer 3 are determined, the components and the proportions thereof of the other material can be automatically determined using the graphs of FIGS. 2 and 3 and the aforementioned formula (3) so that the thermal expansion amounts of the vessel body 2 and the protective layer 3 are nearly equal.

FIG. 4 indicates the preferable relationship between the alumina content and the silicon nitride content, when the alumina content per 100 total parts by weight of alumina and silica in the vessel body 2 is shown relative to the horizontal axis, and the silicon nitride content per 100 total parts by weight of silicon nitride and alumina in the protective layer 3 is shown relative to the vertical axis. As is clear from FIG. 4, the relationship between the two becomes linear.

In an actual induction furnace 1, even if a slight difference in the thermal expansion amount exists between the vessel body 2 and the protective layer 3, the prevention of peeling of the protective layer can be attained. Therefore, based on the results of FIG. 4, using the constituent ratios of the materials for the vessel body 2 and the protective layer 3 as parameters, about 900 kg of steel (S45C) was melted at 1,600° C. for 5 hours in an actual induction furnace 1. Thereafter, the protective layer 3 was observed for the presence of cracking. Table 1 shows the results. Corrosion resistance was also determined by adding 1 kg of sodium carbonate to the molten metal.

TABLE 1

| Crucible Constituent | Coating Constituent | | | | | | |
|---|---|---|---|---|---|---|---|
| | Silicon Nitride 20% | Silicon Nitride 25% | Silicon Nitride 32% | Silicon Nitride 40% | Silicon Nitride 45% | Silicon Nitride 50% | Silicon Nitride 55% |
| Alumina 72% (Silica 28%) | Very Small Cracks "C" | No Cracks, etc. "A" | No Cracks & Excellent Adhesion "A" | No Cracks & Excellent Adhesion "A" | No Cracks, etc. "A" | No Cracks, etc. "A" | Large Cracks "C" |

| Crucible Constituent | Coating Constituent | | | | | | |
|---|---|---|---|---|---|---|---|
| | Silicon Nitride 15% | Silicon Nitride 18% | Silicon Nitride 23% | Silicon Nitride 30% | Silicon Nitride 35% | Silicon Nitride 40% | Silicon Nitride 50% |
| Alumina 85% (Silica 15%) | Cracks Observed "C" | No Cracks, etc. "A" | No Cracks & Excellent Adhesion "A" | No Cracks, etc. "A" | No Cracks, etc. "A" | Small Cracks "B" | Large Cracks "C" |

| Crucible Constituent | Coating Constituent | | | | | | |
|---|---|---|---|---|---|---|---|
| | Silicon Nitride 10% | Silicon Nitride 13% | Silicon Nitride 17% | Silicon Nitride 20% | Silicon Nitride 25% | Silicon Nitride 30% | Silicon Nitride 35% |
| Alumina 95% (Silica 5%) | Cracks Observed "C" | No Cracks, etc. "A" | No Cracks & Excellent Adhesion "A" | No Cracks, etc. "A" | No Cracks, etc. "A" | Large Cracks "C" | Large Cracks "C" |

In Table 1, "A" indicates an excellent condition, "B" indicates a fair condition, and "C" indicates a bad condition.

As shown in Table 1, according to the constituent ratios of the materials of the vessel body 2, the range of the constituent ratios of the materials of the protective layer 3 that does not cause cracking varies. FIG. 5 is a graph that shows the region (appropriate region) in which cracking does not occur according to the results shown in Table 1. More specifically, the region surrounded by the bold lines in FIG. 5 corresponds to the appropriate region. The measurement results shown in FIG. 4 also fail within the appropriate region.

When the alumina content per 100 total parts by weight of alumina and silica in the vessel body 2 is defined as x parts by weight, and the silicon nitride content per 100 total parts by weight of silicon nitride and alumina of the protective layer 3 is defined as y parts by weight, the region wherein the following formulae (1) and (2) can apply corresponds to the appropriate region of FIG. 5 within the range of 72≦x≦95.

$$y<-1.1x+128 \quad (1)$$

$$y>-0.5x+62.5 \quad (2)$$

Regarding each point in the appropriate region in which no cracking was observed, the melting operation under the aforementioned conditions was conducted once a day until 20 days had passed. Table 2 shows the results, including the presence of the penetration of molten metal.

the molten metal and physical damage caused by stirring the molten metal can be effectively prevented by the protective layer 3 formed of a silicon nitride-alumina-based material. Furthermore, because the constituent ratio of the materials for the vessel body 2 and protective layer 3 are arranged so that their thermal expansion amounts become nearly equal, even when a hot molten metal is stored, peeling of the protective layer 3 can be effectively prevented. The durability and the corrosion resistance of the induction furnace 1 thereby being maintained excellent, the lifespan of the induction furnace 1 can be remarkably elongated.

TABLE 2

| Crucible Constituent | Coating Constituent | | | | | | |
|---|---|---|---|---|---|---|---|
| | Silicon Nitride 20% | Silicon Nitride 25% | Silicon Nitride 32% | Silicon Nitride 40% | Silicon Nitride 45% | Silicon Nitride 50% | Silicon Nitride 55% |
| Alumina 72% (Silica 28%) | | No Cracks, etc. "A" No Penetration "A" | No Cracks & Excellent Adhesion "A" No Penetration "A" | No Cracks & Excellent Adhesion "A" No Penetration "A" | Hair Cracks "A" Slight Penetration "B" | Hair Cracks "A" | |

| Crucible Constituent | Coating Constituent | | | | | | |
|---|---|---|---|---|---|---|---|
| | Silicon Nitride 15% | Silicon Nitride 18% | Silicon Nitride 23% | Silicon Nitride 30% | Silicon Nitride 35% | Silicon Nitride 40% | Silicon Nitride 50% |
| Alumina 85% (Silica 15%) | | No Cracks, etc. "A" No Penetration "A" | No Cracks & Excellent Adhesion "A" No Penetration "A" | No Cracks, etc. "A" No Penetration "A" | Hair Cracks "B" No Penetration "A" | | |

| Crucible Constituent | Coating Constituent | | | | | | |
|---|---|---|---|---|---|---|---|
| | Silicon Nitride 10% | Silicon Nitride 13% | Silicon Nitride 17% | Silicon Nitride 20% | Silicon Nitride 25% | Silicon Nitride 30% | Silicon Nitride 35% |
| Alumina 95% (Silica 95%) | | No Cracks, etc. "A" Slight Penetration "B" | No Cracks & Excellent Adhesion "A" No Penetration "A" | No Cracks, etc. "A" Slight Penetration "B" | Hair Cracks "B" Penetration "C" | | |

In Table 2, "A" indicates an excellent condition, "B" indicates a fair condition, and "C" indicates a bad condition.

As shown in Table 2, if the proportion of silicon nitride is large, small hair-like cracking (hair cracks) appear with the passage of time. This causes the molten metal to permeate easily, and the durability of the vessel tends to deteriorate. Judging from the results of Table 2, within the range of 72≦x≦95, the range wherein the following formulae (2) and (3) can apply falls in the region in which excellent durability and corrosion resistance can be attained (the portion having oblique lines in FIG. 5). Within the region of 72≦x≦85, the portion having oblique lines in FIG. 5 exhibits extremely excellent durability and corrosion resistance.

$$y>-0.5x+62.5 \quad (2)$$

$$y<-0.9x+103 \quad (3)$$

As described above, in the induction furnace 1 of the present embodiment, the vessel body 2 is formed of an alumina-silica-based material having excellent mechanical properties, heat resistance, and thermal stability. In this embodiment, chemical damage due to the additives added to There is no limitation to the vessel for molten metal of the present invention as long as it can store the molten metal; in addition to the above-mentioned induction furnace, the vessel may, for example, be formed as a resistance furnace or like electric furnace, or a combustion furnace.

Figure 1:
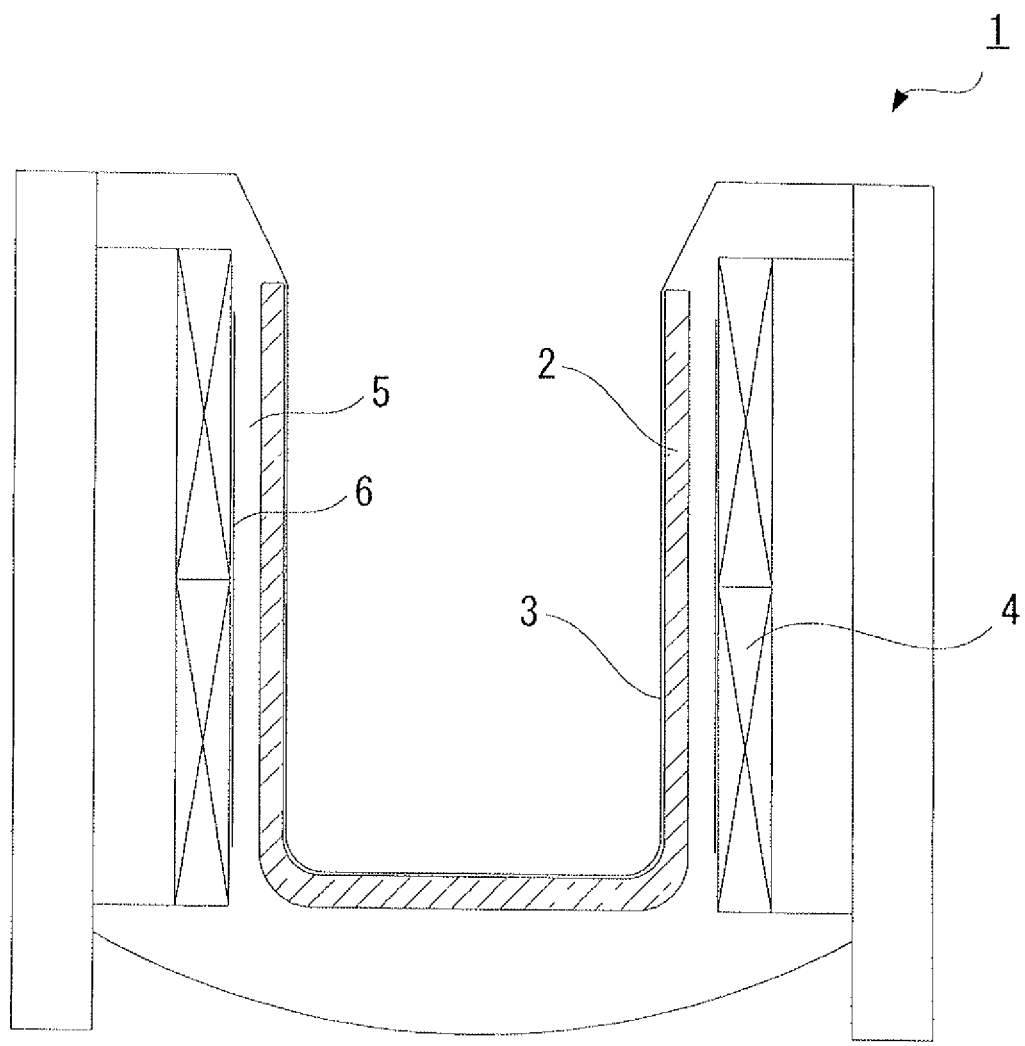
FIG. 1 is a longitudinal sectional view of the vessel for molten metal according to one embodiment of the present invention.
Figure 2:
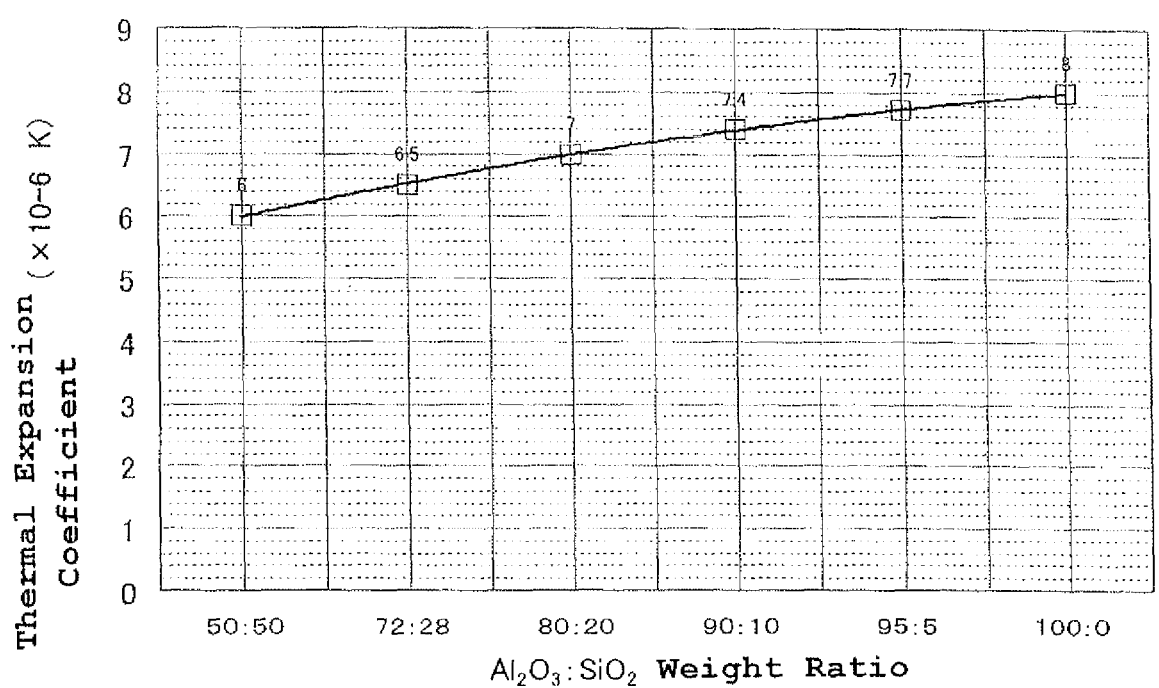
FIG. 2 shows the relationship between the constituent ratio of the material for the vessel body and the coefficient of thermal expansion.
Figure 3:
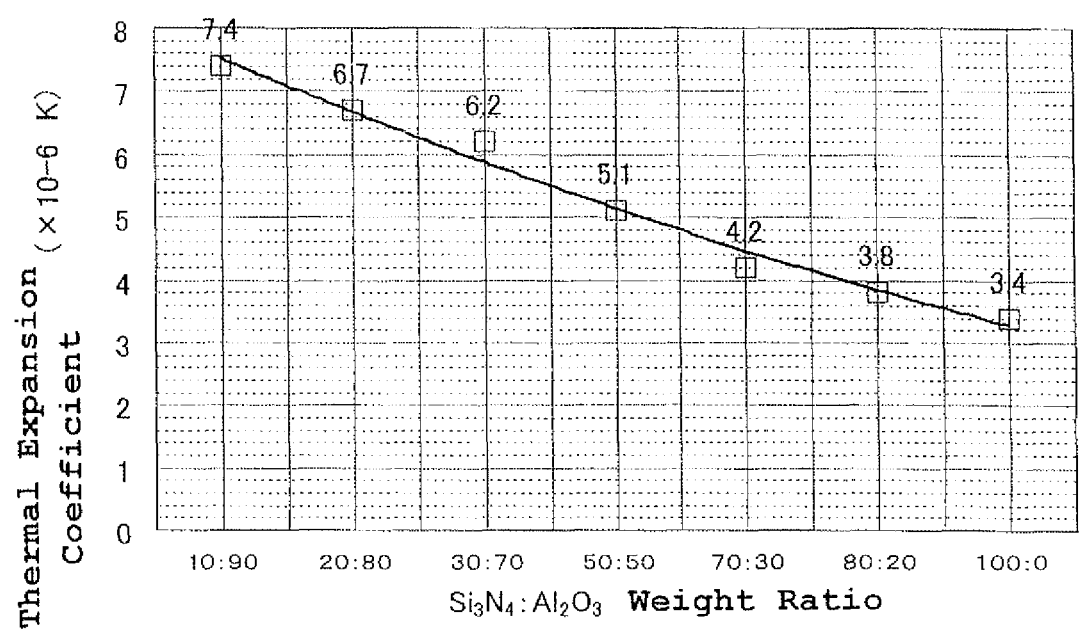
FIG. 3 shows the relationship between the constituent ratio of the material for the protective layer and the coefficient of thermal expansion.
Figure 4:
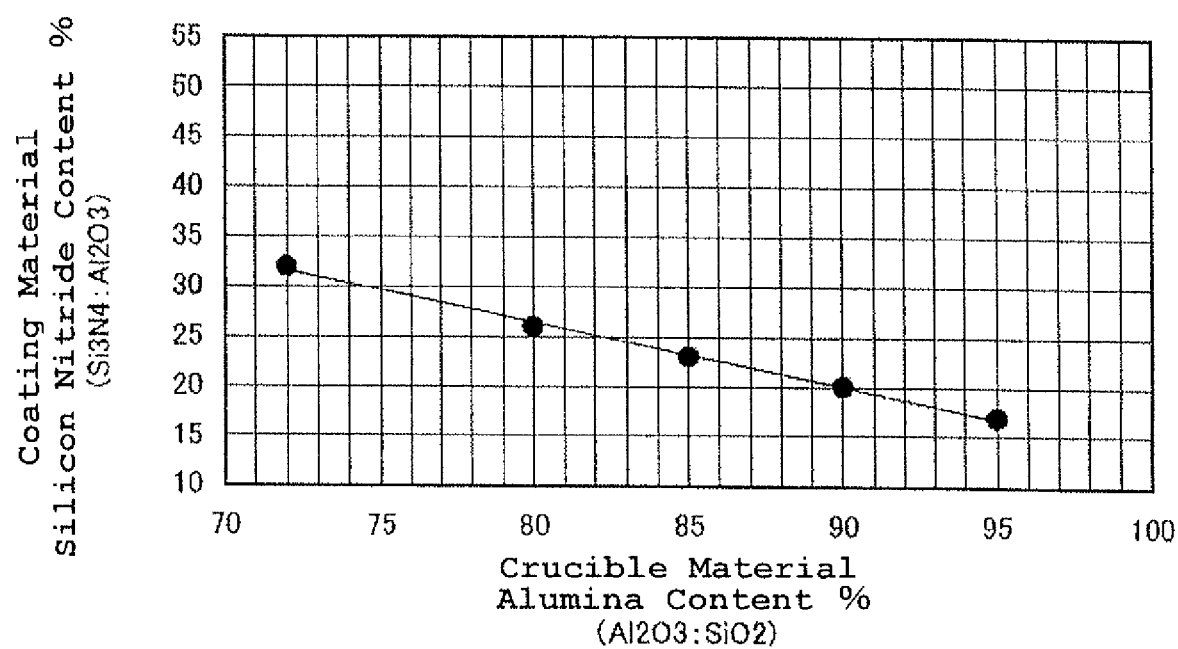
FIG. 4 is a graph showing the preferable relationship between the constituent ratio of the material for the vessel body and the constituent ratio of the material for the protective layer obtained by calculation.
Figure 5:
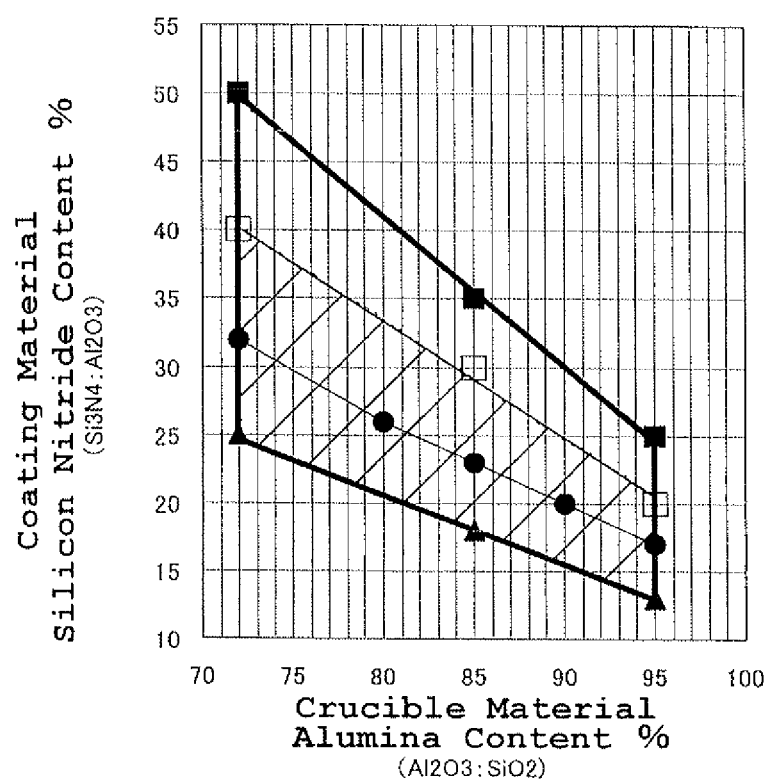
FIG. 5 is a graph showing the preferable relationship between the constituent ratio of the material for the vessel body and the constituent ratio of the material for the protective layer obtained by experiments.

| Explanation of Reference Numerals |
| --- |
| 1 induction furnace |
| 2 vessel body |
| 3 protective layer |
| 4 induction coil |
| 5 aggregate |
| 6 thermal insulating material |

The invention claimed is:

1. A vessel for molten metal comprising:
a vessel body formed of an alumina-silica-based material; and
a protective layer formed of a silicon nitride-alumina-based material provided on an inner surface of the vessel body,
the material for the vessel body being adjusted to have an alumina content x of 72 to 95 parts by weight per 100 total parts by weight of alumina and silica,
the material for the protective layer being adjusted to have a silicon nitride content y of 13 to 50 parts by per total 100 parts by weight of silicon nitride and alumina in such a manner that y satisfies the following formulae (1) and (2):

$$y < -1.1x + 128 \tag{1}$$

$$y > -0.5x + 62.5 \tag{2}$$

2. The vessel for molten metal according to claim 1, wherein the protective layer has a thickness of 0.2 to 1.0 cm.

* * * * *